United States Patent [19]
Wu et al.

[11] Patent Number: 6,108,046
[45] Date of Patent: Aug. 22, 2000

[54] AUTOMATIC DETECTION OF HDTV VIDEO FORMAT

[75] Inventors: Siu-Wai Wu; Keming Joseph Chen, both of San Diego; Erik Elstermann, Carlsbad, all of Calif.

[73] Assignee: General Instrument Corporation, Horsham, Pa.

[21] Appl. No.: 09/088,786

[22] Filed: Jun. 1, 1998

[51] Int. Cl.[7] .................................................. H04N 5/46
[52] U.S. Cl. ............................................................ 348/558
[58] Field of Search ..................................... 348/558, 554, 348/555, 556, 540, 541, 542, 543, 545, 546, 547, 548, 553; H04N 5/46

[56] References Cited

U.S. PATENT DOCUMENTS

| | | | |
|---|---|---|---|
| 4,922,343 | 5/1990 | Ando | 348/558 |
| 5,134,481 | 7/1992 | Gornati et al. | 348/558 |
| 5,530,484 | 6/1996 | Bhatt et al. | |
| 5,610,661 | 3/1997 | Bhatt | |
| 5,767,917 | 6/1998 | Gornstein et al. | 348/543 |
| 5,872,601 | 2/1999 | Seitz | 348/558 |

*Primary Examiner*—Michael H. Lee
*Attorney, Agent, or Firm*—Barry R. Lipsitz; Ralph F. Hoppin

[57] ABSTRACT

A method and apparatus for automatically detecting the format of a high-definition television (HDTV) signal at a video encoder to allow proper encoding of the signal, including progressive and interlaced scan, and specific pixel and vertical line resolutions. The system is compatible with video standards such as the SMPTE and MPEG-2 standards. A video sample clock is determined by phase-locking clock pulses in a video signal to one of two or more available reference clocks. An SAV/EAV counter and pixel sample counter determine the horizontal resolution of the video, e.g., pixels per line. The system discriminates between 24 frames per second video and 30 frames per second video, and between a 720 line progressive scan signal and a 1080 line interlaced scan signal, for example. The system uses PLLs for each reference clock, where a lock range of the PLLs is narrow such that two PLLs will not lock at the same time for one input frequency. F bits in the video signal are used if required to distinguish progressive scan from interlaced scan.

18 Claims, 6 Drawing Sheets

AUTOMATIC DETECTION OF HDTV VIDEO FORMAT

BACKGROUND OF THE INVENTION

The present invention relates to a method and apparatus for automatically detecting the format of a television signal at a video encoder to allow proper encoding of the signal. The invention is particularly suited for detecting high-definition television (HDTV) formats.

The communication of digital video, audio, and other data has become increasingly common due to the improved fidelity, bandwidth efficiency, and versatility of digital signals relative to analog signals. For example, many digital television broadcast systems deliver digital television signals to users' homes via direct satellite broadcasts. Moreover, terrestrial broadcast of digital television signals is also expected to gain widespread acceptance.

The television or other digital data may be obtained via various methods. For example, a broadcaster may have a local library of digital television programs or other data which is stored on magnetic storage media such as magnetic tape, or optical storage media, such as compact disc, digital video disc, or laser disc. The broadcaster may also receive digital television or other data from another transmission source, including, for example, a satellite distribution network, a terrestrial broadcast network, or a microwave distribution network.

The video data may be digitized, compressed and encoded when it is obtained, e.g., at a television studio, or may be compressed subsequently, e.g., at a satellite uplink station. Moreover, the video data may be stored in a compressed or uncompressed state. Generally, compression involves transforming data samples in the pixel domain to a spatial frequency domain, quantizing, and coding using differential coding and Huffman encoding. The encoded data is then multiplexed with other video signals in a digital transport data stream. Motion compensation and estimation may also be used in the pixel domain to provide further compression.

However, for proper compression and encoding, the format of the video data must be known. Currently, various formats of HDTV are specified in the Advanced Television Systems Committee's (ATSC) digital television standard which is adopted by the Federal Communications Commission (FCC) as the digital television broadcasting standard in the United States. The HDTV formats include:

(1) 1920×1080×60 frames per second progressive scan, with a pixel sampling frequency of 148.5 MHz;

(2) 1920×1080×59.94 frames per second progressive scan, with a pixel sampling frequency of 148.5/1.001= 148.35 MHz;

(3) 1920 horizontal pixels×1080 lines×30 fields per second interlaced scan (e.g., 540 lines per field), with a pixel sampling frequency of 74.25 MHz;

(4) 1920 horizontal pixels×1080 lines×29.97 fields per second interlaced scan (e.g., 540 lines per field), with a pixel sampling frequency of 74.25/1.001=74.175 MHz;

(5) 1920 horizontal pixels×1080 lines×24 frames per second progressive scan, with a pixel sampling frequency of 74.25 MHz;

(6) 1920 horizontal pixels×1080 lines×23.98 frames per second progressive scan, with a pixel sampling frequency of 74.25/1.001=74.175 MHz;

(7) 1920×1080×30 frames per second progressive scan, with a pixel sampling frequency of 74.25 MHz;

(8) 1920 horizontal pixels×1080 lines×29.97 frames per second progressive scan, with a pixel sampling frequency of 74.25/1.001=74.175 MHz;

(9) 1920×1080×25 frames per second progressive scan, with a pixel sampling frequency of 74.25 MHz;

(10) 1280 horizontal pixels×720 lines×60 frames per second progressive scan, with a pixel sampling frequency of 74.25 MHz; and

(11) 1280 horizontal pixels×720 lines×59.94 frames per second progressive scan, with a pixel sampling frequency of 74.25/1.001=74.175 MHz.

Note that pixel numbers refer to active pixels, and lines per frame or field refer to active lines. The 1920×1080 formats are discussed in the document SMPTE 274M, entitled "Proposed SMPTE Standard for Television—1920× 1080 Scanning and Analog and Parallel Digital Interfaces for Multiple-Picture Rates." The 1280×720 formats are discussed in the document SMPTE 296M, entitled "SMPTE Standard for Television—1280×720 Scanning, Analog and Digital Representation and Analog Interface."

Compressed HDTV data formats may be governed by the MPEG-2 standard, described in document ISO/IEC 13818-2, entitled "Information Technology—Generic Coding of Moving Pictures and Associated Audio, Recommendation H.262."

HDTV formats at 30/29.97 frames per second have gained acceptance in the United States, while European HDTV formats may employ 25 frames per second.

Additionally, digital standard definition television (SDTV) formats include NTSC at 30 frames per second, and 525 lines per frame, and PAL at 25 frames per second, and 625 lines per frame.

Previously, when video data having different formats was compressed and encoded, a user command was necessary to inform the encoder of the current video format as well as subsequent changes in the video format. For example, the video format might change when a live television broadcast is followed by a recorded movie on a television channel. This procedure is inefficient, unreliable, and inconvenient.

Accordingly, it would be desirable to provide a system which automatically detects the format of a video source, including HDTV video as well as SDTV, and progressive as well as interlaced scan. The system should be compatible with video standards such as SMPTE and video compression standards such as MPEG-2.

The present invention provides a system having the above and other advantages.

SUMMARY OF THE INVENTION

The present invention relates to a method and apparatus for automatically detecting the format of a television signal at a video encoder to allow proper encoding of the signal. The invention is particularly suited for detecting high-definition television (HDTV) formats. The format is generally defined by the vertical and horizontal pixel resolution, the frame rate, and whether the video is progressive scan or interlaced scan.

A method for determining the format of a video signal is disclosed where the video signal includes successive pictures (e.g., frames or fields). Each picture has successive lines, and at least some of the lines have at least one reference sequence followed by successive pixel sample fields. A clock signal of the video signal is provided that has successive clock pulses which correspond to the pixel sample fields. That is, the clock frequency is the same as the pixel sampling frequency. The method includes the steps of detecting the reference sequence in a particular line of the video signal, initiating a count of the clock pulses in response to the detection of the reference sequence; and detecting the reference sequence in a subsequent line which follows the particular line. The count reaches a reference count value when the reference sequence in the subsequent line is detected. The method includes the further steps of providing a signal indicative of the reference count value to a control; and determining the format of the video signal at the control in accordance with the reference count signal.

The reference sequence may include a start of active video (SAV) sequence and/or an end of active video sequence (EAV).

The method may include the further step of providing a control signal from the control to a video compressor for compressing the video signal in accordance with the detected format thereof.

The reference count value may designate a horizontal resolution, vertical resolution (e.g., lines per frame) and frame rate of the video signal.

The method may include the further steps of monitoring the clock signal to determine when the clock pulses are not available; and providing a control signal in response to the monitoring step to select an auxiliary clock signal when the clock pulses are not available.

The method may include the further steps of detecting successive ones of the clock pulses from the clock signal to obtain a video signal clock; providing a first clock reference signal at a first frequency, and a second clock reference signal at a second frequency that is different from the first frequency; comparing a phase of the clock pulses to respective phases of the first and second reference clocks, e.g., in a phase-locked loop, to determine which of the reference clocks corresponds thereto; providing a signal indicative of the corresponding reference clock to the control; and determining the format of the video signal in accordance with the corresponding reference clock.

The method may include the further steps of determining a format of successive pictures of the video signal to detect a format change from a first format to a second format; and inserting a sequence end code into the still-compressed video signal after the last picture that is provided with the first format. A sequence header may be inserted at the beginning of the first compressed picture which is provided at the second format.

The method may include the further step of detecting F bits of the video signal, which is a predetermined bit sequence, and determining whether the video signal is progressive scan or interlaced scan in accordance with the detected F bits.

A corresponding apparatus is also presented.

DETAILED DESCRIPTION OF THE INVENTION

The present invention relates to a method and apparatus for automatically detecting the format of a television signal at a video encoder to allow proper encoding of the signal. The invention is particularly suited for detecting high-definition television (HDTV) formats.

Figure 1:
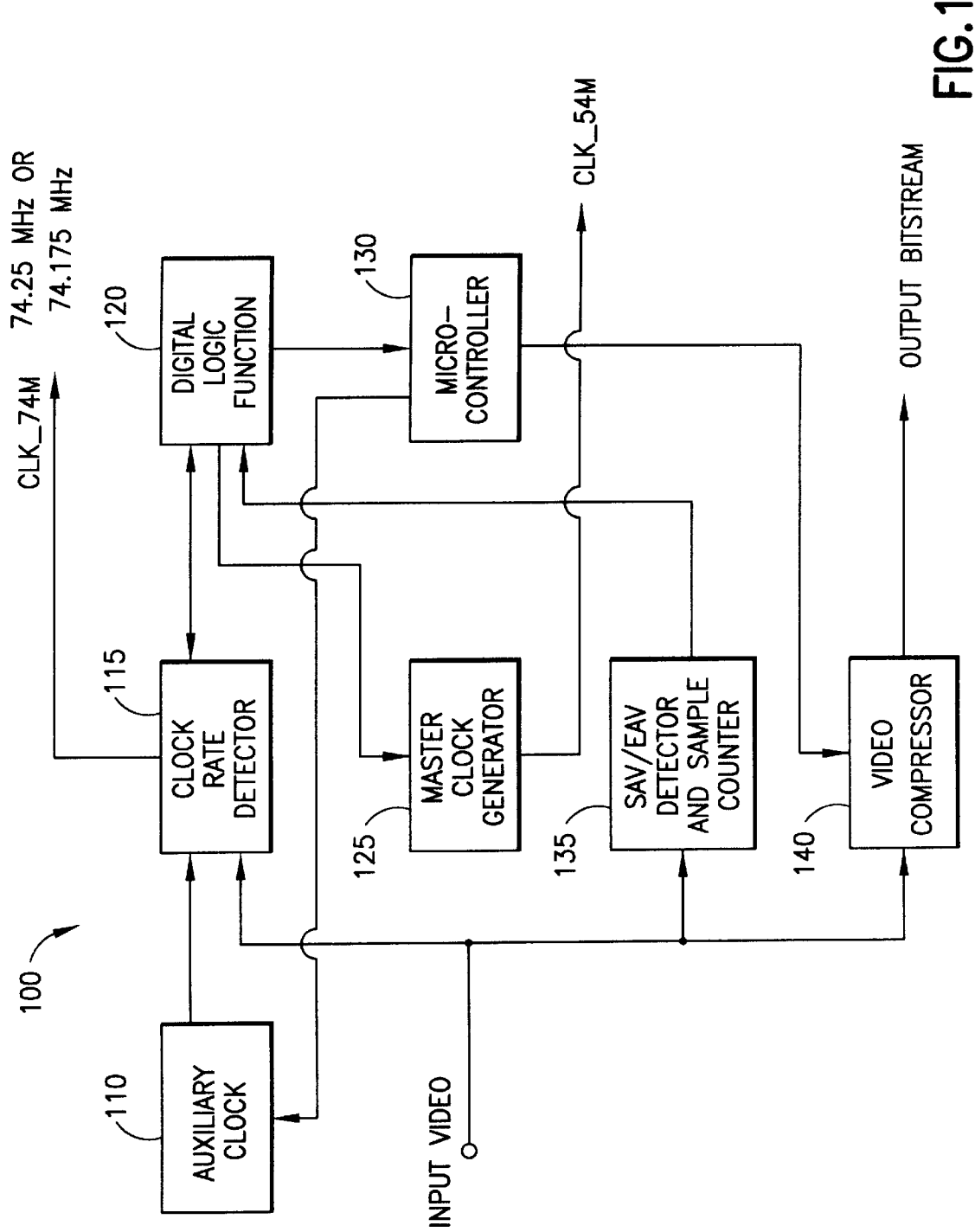
FIG. 1 illustrates an overview of a video format detector circuit in accordance with the present invention.

FIG. 1 illustrates an overview of a video format detector circuit in accordance with the present invention. The circuit is shown generally at 100. An input video signal comprising uncompressed digital pixel data is provided to a clock rate detector 115, a Start of Active Video (SAV)/End of Active Video (EAV) detector and sample counter 135, and a video compressor 140. The input video signal includes a separate clock signal, CLK, with clock pulses at 74.25 MHz or 74.175 MHz for formats (3)–(11). For formats (1) and (2), a clock at 148.5 or 148.35 MHz is used. The CLK signal may be carried physically on a separate wire than the video data. For example, twenty wires may be used for pixel data, e.g., ten for ten-bit luma samples and ten for ten-bit chroma samples, and one for the clock signal. The clock signal is considered to be a video clock signal since the pixel samples are in sync with the clock. The clock rate detector 115 detects the input video clock and provides a corresponding output signal, CLK_74M, at 74.25 MHz or 74.175 MHz, which may be used as a video sample clock. If the circuit 100 is operating in a free-running mode, i.e., no input video signal is provided to the clock rate detector 115, the auxiliary clock 110 will provide the video clock signal at 74.25 MHz or 74.175 MHz according to a control signal from a micro-controller 130.

The SAV/EAV detector and sample counter 135 detects the frame rate of the input video signal, e.g., 23.98, 24, 29.97, 30, 59.94, or 60 frames per second. The term "picture" is used herein to indicate a single frame, e.g., from a progressive scan signal, or one field from an interlaced scan signal. The detector/counter 135 determines the number of pixel samples between successive SAV or EAV fields in the video data and provides a corresponding control signal to a digital logic function 120, which may be implemented as a Programmable Logic Array (PLA). The digital logic function 120 also communicates with the clock rate detector 115.

Based on the information received from the clock rate detector 115 and the detector/counter 135, the digital logic function 120 determines the format of the input video signal. The digital logic function 120 provides a control signal that corresponds to the detected video format to a master clock generator 125 that, in turn, provides a fixed output signal, CLK_54M, at 54 MHz. This output signal may be used as a system clock. For example, CLK_54M may be divided by two to provide a 27 MHz MPEG-2 clock that is used by a data packetizer.

The digital logic function 120 also provides a control signal to the micro-controller 130, which in turn sends a control signal, such as a predetermined code word, to the video compressor 140 to compress the input video data using the appropriate format. The video compressor 140 then outputs a corresponding compressed digital video bit stream.

Figure 2:
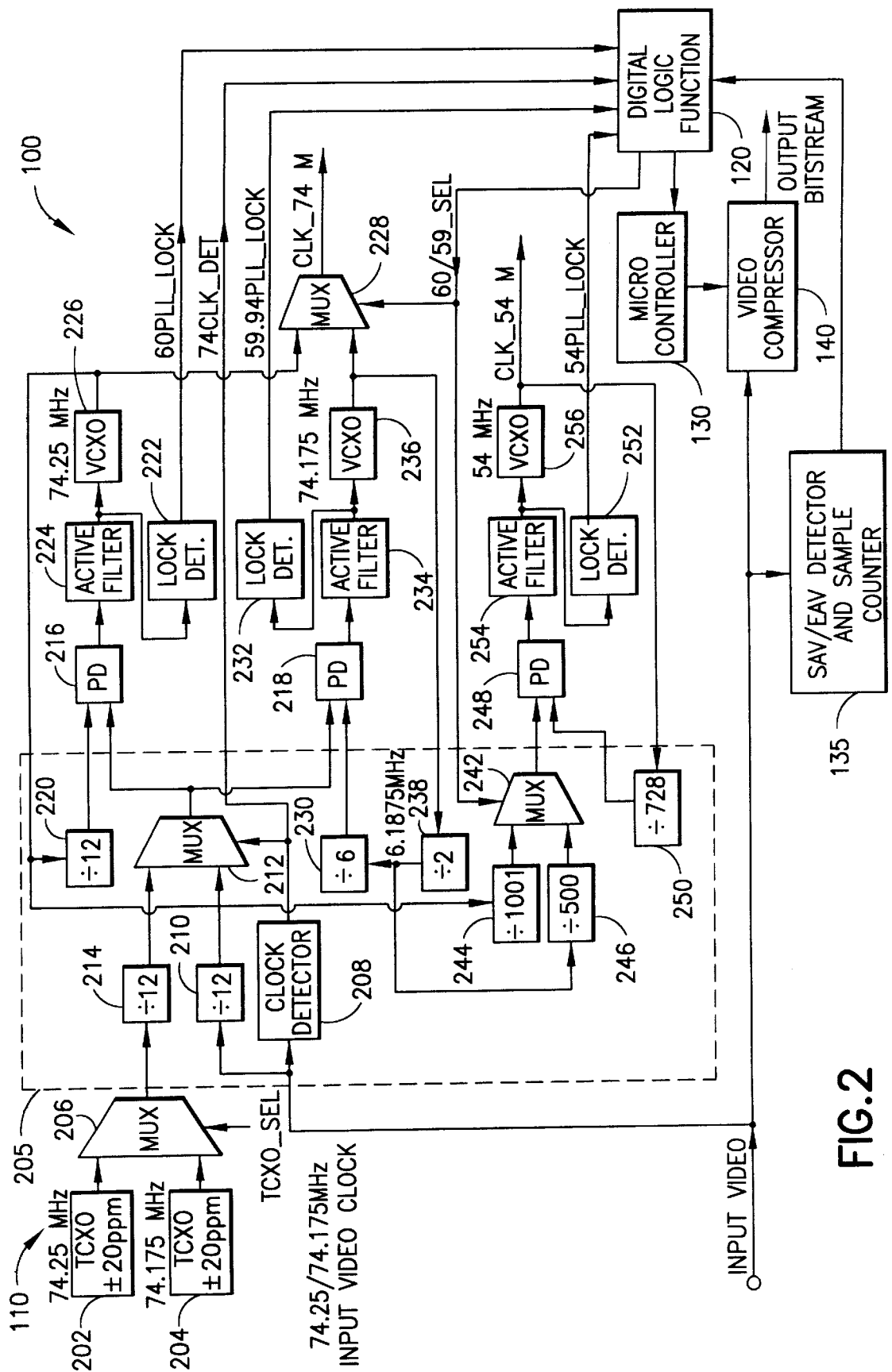
FIG. 2 illustrates a detailed view of a video format detector circuit in accordance with the present invention.

FIG. 2 illustrates a detailed view of a video format detector circuit in accordance with the present invention. Like-numbered elements in FIG. 2 correspond to the elements of FIG. 1. If an input video signal is present, the input video clock pulses CLK, discussed in connection with FIG. 4, below, are provided to a clock detector 208 and to a divider 210. If the clock detector 208 detects the CLK pulses, the clock detector 208 sends a control signal to a multiplexer (MUX) 212 to command the MUX to pass the value output from the divider 210. If no input video clock is detected by the clock detector 208, the MUX 212 is commanded to pass an auxiliary clock value from a divider 214.

The divider 214 receives a clock signal from the auxiliary clock, shown generally at 110. The auxiliary clock 110 includes a first temperature-controlled crystal oscillator (TCXO) 202 that oscillates at 74.25 MHz, and a TCXO 204 that oscillates at 74.175 MHz. Each oscillator 202, 204 may have a tolerance of ±20 parts per million (ppm), for example. A MUX 206 passes a clock signal from one of the oscillators 202, 204 in response to a selection signal TCXO_SEL. When CLK is not available, TCXO_SEL is provided automatically by the digital logic function 120 via a line not shown as the most recent detected CLK rate.

The output from the MUX 212 is provided to phase detectors (PDs) 216 and 218. A feedback signal is also provided to the PD 216 via a divider 220, while a feedback signal is provided to the PD 218 via a divider 230. The output from the PDs 216 and 218 are filtered by active filters 224 and 234, respectively, which are low-pass filters built around operational amplifiers. The active filters 224 and 234 remove high frequency components. The output of the filter 224 is a control voltage that is provided to the voltage controlled crystal oscillator (VCXO) 226 and a lock detector circuit 222, while the output of the filter 234 is a control voltage that is provided to the VCXO 236 and a lock detector circuit 232. Similarly, the input to VCXO 256 is a control voltage.

If the two signals which are input to the PD 216 are in phase with one another, e.g. they are operating at the same frequency, then the control voltage that is provided to the lock detector 222 will be within a predetermined voltage range, thereby causing the detector 222 to declare a PLL lock condition. The lock detector 222 will send a corresponding control signal, 60PLL_LOCK, to the digital logic function 120, indicating the locked or unlocked status.

The lock detectors 222, 232, 252 are discussed in greater detail in connection with FIG. 6, below.

The VCXO 226 has a free running frequency of 74.25 MHz. The output from the VCXO 226 is fed back to the PD 216 via the divider 220 as discussed, and also provided to a divider 244 and a MUX 228.

The divider 220, PD 216, active filter 224, VCXO 226, and the path between the VCXO 226 and the divider 220 form a phase-locked loop (PLL).

Similarly, the output from the MUX 212 that is provided to the PD 218 is compared to an input signal from a divider 230, which has a frequency of 6.1875 MHz. If the output from the MUX 212 is in phase with the output from the divider 230, the corresponding signal output from the PD 218 will cause a lock condition in the lock detector 232, after filtering at the active filter 234. The lock detector will then provide a corresponding control signal, 59.94PLL_LOCK, indicating the locked or unlocked status, to the digital logic function 120. Additionally, the filtered signal from the filter 234 will be provided to a VCXO 236 that has a free running frequency of 74.175 MHz. The output from the VCXO 236 is provided to the MUX 228, and to the PD 218 in a feedback path via dividers 238 and 230.

The dividers 238 and 230, PD 218, active filter 234, VCXO 236, and the path between the VCXO 236 and the divider 238 form a PLL.

The digital logic function 120 also receives a control signal from the SAV/EAV detector and sample counter 135 indicating the number of samples between successive SAV or EAV fields in the input video data. Moreover, the digital logic function 120 receives a signal, 74CLK_DET, from the clock detector 208 indicating that the input video clock CLK is present. Based upon each of the input signals, the digital logic function 120 determines the format of the input video signal, and provides an output signal, 60/59_SEL, that is used by the MUX 228 to select a video sample clock from either the VCXO 226, running at 74.25 MHz, or the VCXO 236, running at 74.175 MHz.

The output from the MUX 228, CLK_74M, is the corresponding master clock signal (e.g., video sample clock). The selection signal, 60/59_SEL, is also provided to a MUX 242 to select an input signal from a divider 244 or divider 246. The output from the divider 244 is at 74.25 MHz/1001=74.17582418 KHz, while the output from the divider 500 is at 74.175 KHz. A PD 248 receives an output from the MUX 242 and a signal from a divider 250, which is also at 54 MHz/728=74.17582418 KHz. If a lock condition is detected in the output of the active filter 254, the lock detector 252 sends a control signal, 54PLL_LOCK, indicating the locked or unlocked status, to the digital logic function 120. The filtered output is provided to a VCXO 256 to provide the clock signal CLK_54M. The VCXO 256 has a free running frequency of 54 MHz.

The VCXOs 226, 236 and 256 may operate with a tolerance of ±80 ppm, for example.

After determining the format of the input video signal, the digital logic function 120 sends a corresponding control signal to the micro-controller 130, which in turns commands a video compressor 140 to compress the input video data using the appropriate format.

The SAV/EAV detector and sample counter 135 detects the start of active video and end of active video data for each line of the input video signal. The counter 135 also counts the number of active and inactive pixel samples in each active video line, as discussed in greater detail below.

The elements in the box 205 may be implemented in a field-programmable gate array (FPGA).

Note that in FIG. 2., the design may be extended to detect 1920×1080×60 Hz or 59.94 Hz (e.g., formats (1) and (2), respectively) by adding two more PLLs to detect sample clocks at 148.5 MHz and 148.5/1.001=148.35 MHz.

Figure 3:
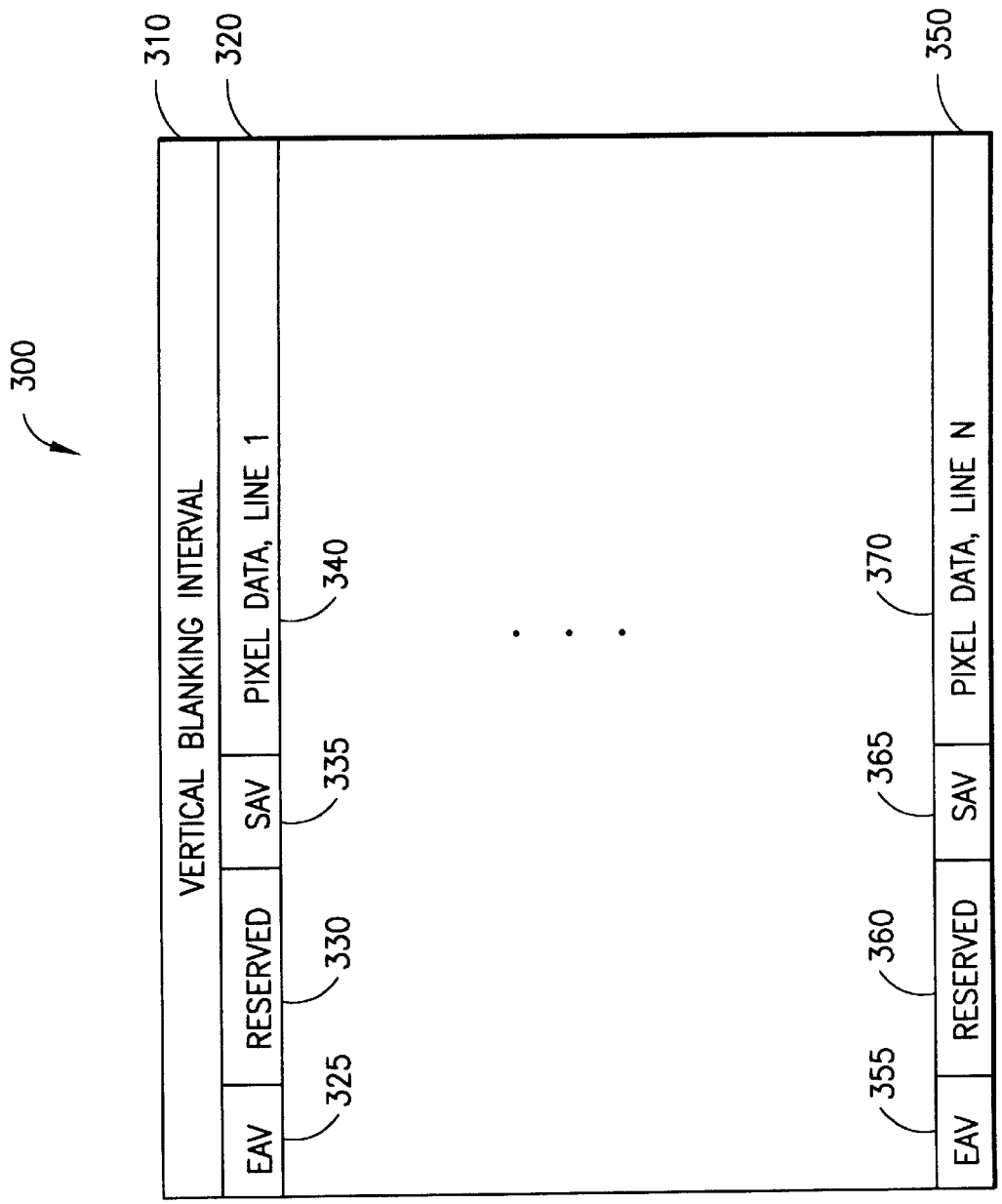
FIG. 3 illustrates a sample video frame for use with the present invention.

FIG. 3 illustrates a sample video frame for use with the present invention. A video frame, shown generally at 300, includes a vertical blanking interval 310 and a number of video lines 1 through N. For example, the frame 300 may have 720 or 1,080 active video lines. For interlaced scan video, a frame has 540 active lines. A first video line 320 includes an EAV field 325, a reserved data field 330, an SAV field 335, and a first line of digital pixel data 340. The reserved data field 330 may include ancillary data or blanking codewords. Similarly, an Nth line 350 includes an EAV field 355, a reserved field 360, an SAV field 365, and an Nth line of pixel data 370. For example, each line of pixel data 340, 370 may have 1,280 or 1,920 active digital pixel samples for HDTV formats.

Figure 4:
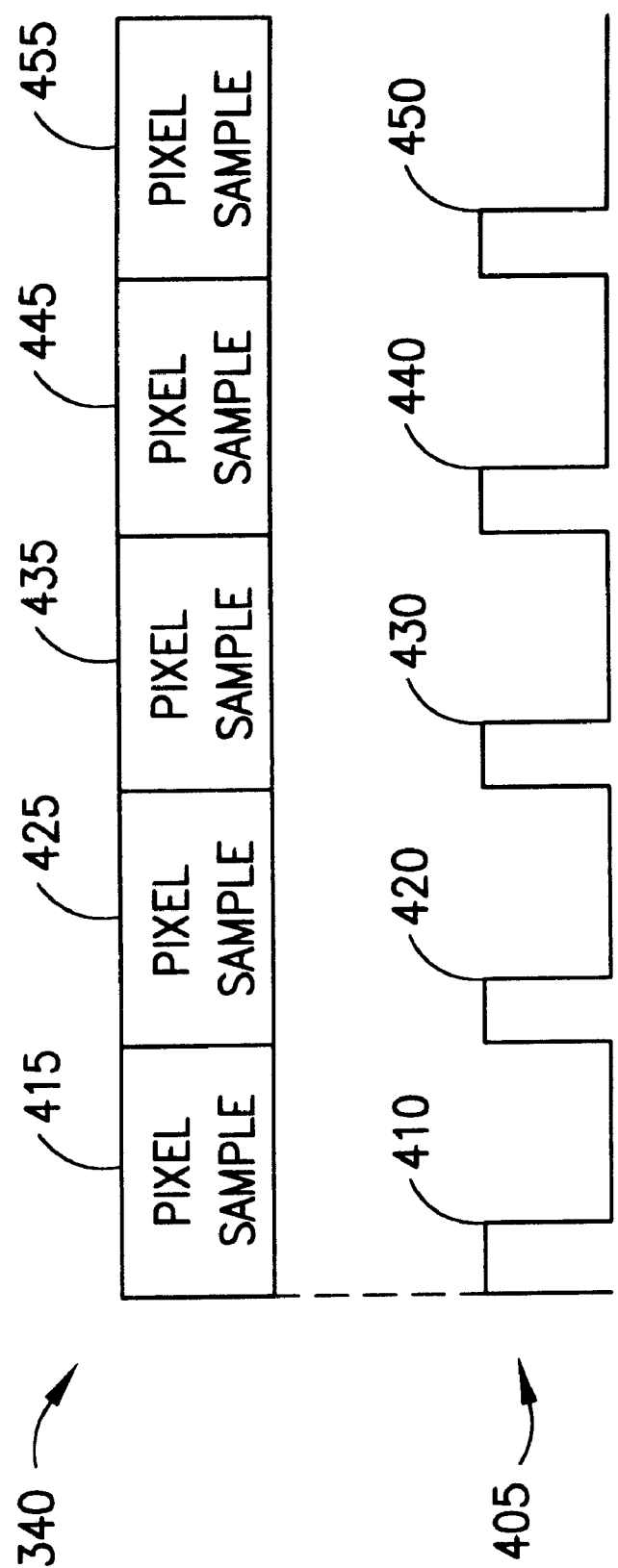
FIG. 4 illustrates a sample video line for use with the present invention.

FIG. 4 illustrates a sample video line for use with the present invention. Each pixel data line 340 in a frame includes successive pixel sample fields. Moreover, a clock signal 405 includes clock pulses CLK 410, 420, 430, 440 and 450 that correspond to pixel sample fields 415, 425, 435, 445 and 455, respectively. The CLK pulses are detected by the clock detector 208 of FIG. 2 to determine a clock rate of the input video signal.

Each pixel sample field 415, 425 and 435 includes luma pixel data and interpolated chroma pixel data.

Figure 5:
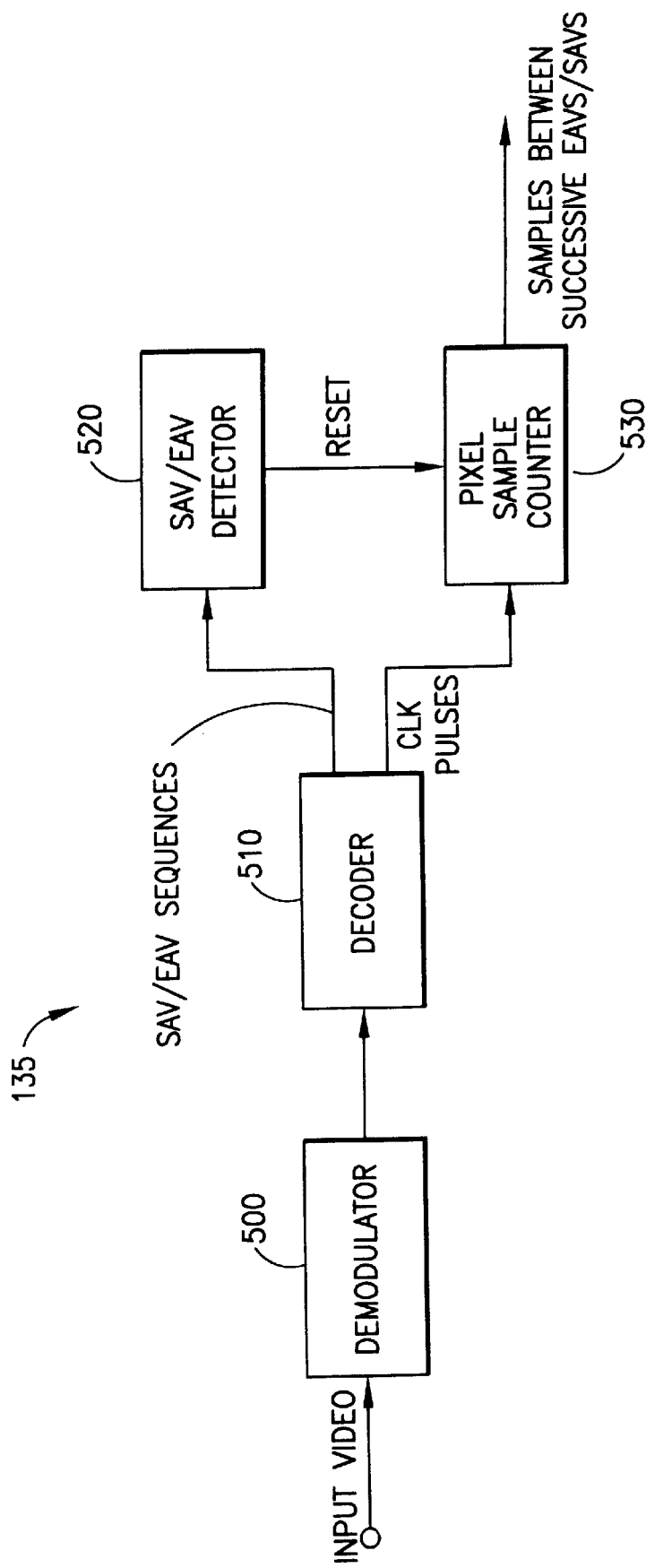
FIG. 5 illustrates a SAV/EAV detector and sample counter in accordance with the present invention.

FIG. 5 illustrates a SAV/EAV detector and sample counter in accordance with the present invention. The SAV/EAV detector and sample counter 135, also referred to in FIGS. 1 and 2, detects each SAV field 335, 365 or EAV field 325, 355 of FIG. 3 according to a predetermined sequence of bits which identify the SAV or EAV, respectively. The SAV and EAV sequences may be considered to be reference sequences since they define a reference point in each video line. As explained in the aforementioned SMPTE 274M and 296M standards, for example, an SAV or EAV sequence comprises four consecutive codewords, namely a code word of all ones, two code words of all zeros, and a code word with F, V, H and P bits.

F bits designate whether the current frame is progressive scan or interlaced scan. Specifically, for progressive scan, the F bit is always zero, while for interlaced scan, the F bit is "zero" for each line in the first field, and "one" for each line in the second field of each frame. V bits designate that the current line is part of a vertical blanking interval. H bits designate a horizontal blanking interval. P bits are parity bits. An SAV sequence is identified by H=0, while an EAV sequence is identified by H=1.

Accordingly, by demodulating the input video signal at a demodulator 500, and decoding the various data fields at a decoder 510, the SAV and/or EAV sequences can be provided to an SAV/EAV detector 520, while the CLK pulses are provided to a pixel sample counter 530. The detector 520 and counter 530 may be implemented using known counter circuitry.

The SAV/EAV detector 520 detects each SAV or EAV field in the video data, and issues a reset command to the pixel sample counter 530 when each successive SAV or EAV field is detected. Additionally, the SAV/EAV detector 520 can detect the F bits to distinguish between progressive scan and interlaced scan. For example, the SAV/EAV detector and sample counter 135 can distinguish between progressive scan and interlaced scan for 1920×1080×30 Hz or 29.97 Hz based on the F bits.

After each reset signal from the SAV/EAV detector 520, the pixel sample counter 530 initiates a count of the number of CLK pulses for each line to determine the pixel resolution. While it is sufficient to determine the number of pixels per line based on the number of CLK pulses counted for only one line in a frame, preferably a pixel resolution is determined for each line so that an error can be quickly detected when the pixel resolution does not match any known value. A corresponding signal which indicates the number of pixel samples between successive EAVs or SAVs is then provided from the counter 530 to the digital logic function 120 of FIGS. 1 and 2. The signal indicates a sample reference count, which is the count value when a subsequent reset signal is received at the counter 530.

Variations in the sample count scheme may be used. For example, it is possible to determine the number of pixel samples between non-consecutive EAVs or SAVs and index the number to a single line.

With the clock rate, number of pixels per line, and F bits known, the format of the input video data can be determined by the digital logic function 120 of FIGS. 1 and 2 according to Table 1. Knowledge of the F bits is not required in all cases to detect the format with certainty.

It is assumed that the design of FIG. 2 is extended to detect sample clocks at 148.5 MHz and 148.5/1.001=148.35 MHz, with logical clock signals 148.5PLL_LOCK and 148.35PLL_LOCK, respectively.

TABLE 1

| 60 PLL_LOCK | 59.94 PLL_LOCK | 148.5 PLL_LOCK | 148.35 PLL_LOCK | Samples between successive SAVs or EAVs | Video Format | Notes: |
|---|---|---|---|---|---|---|
| X | X | TRUE | FALSE | 2200 | (1) 1920 × 1080 × 60 (P) | |
| X | X | FALSE | TRUE | 2200 | (2) 1920 × 1080 × 59.94 (P) | |
| TRUE | FALSE | X | X | 2200 | (3) 1920 × 1080 × 30 (I) | F bits required |
| FALSE | TRUE | X | X | 2200 | (4) 1920 × 1080 × 29.97 (I) | F bits required |
| TRUE | FALSE | X | X | 2750 | (5) 1920 × 1080 × 24 (P) | |
| FALSE | TRUE | X | X | 2750 | (6) 1920 × 1080 × 23.98 (P) | |
| TRUE | FALSE | X | X | 2200 | (7) 1920 × 1080 × 30 (P) | F bits required |
| FALSE | TRUE | X | X | 2200 | (8) 1920 × 1080 × 29.97 (P) | F bits required |
| TRUE | FALSE | X | X | 2640 | (9) 1920 × 1080 × 25 (P) | |
| TRUE | FALSE | X | X | 1650 | (10) 1280 × 720 × 60 (P) | |
| FALSE | TRUE | X | X | 1650 | (11) 1280 × 720 × 59.94 (P) | |
| X | X | X | X | Other values | Sync Loss | |
| FALSE | FALSE | X | X | X | Sync Loss | |
| TRUE | TRUE | X | X | X | PLL fault | |

In Table 1, "(I)" designates interlaced scan video, while "(P)" designates progressive scan video. "X" designates "don't care" values. If the number of pixels per line is anything other than the values listed, a sync loss is declared, and a corresponding error message is provided to a system controller. If both 60PLL_LOCK and 59.94PLL_LOCK are TRUE, a PLL fault is declared since the input video signal cannot have two different clock rates. Note that the F bits are required to distinguished format (3) from format (7), or format (4) from format (8).

Note that the number of samples between successive SAVs or EAVs is greater than the number of active pixel samples per line. For example, for format (1), there are 2200 samples between successive SAVs or EAVs, but only 1920 active pixel samples per line. The reserved data and inactive pixel samples account for the remaining samples.

The detected video format may be designated by a parameter "video_mode", and read by a Master Compression Controller once per frame. If a change in video format is determined, the MCC does the following: (1) force the last Group of Pictures (GOP) of the old video format to be a closed GOP, (2) inserts a MPEG-2 sequence_end_code (0x000001B7) in the bitstream after the last frame of the old video format, and (3) inserts a sequence header at the beginning of the new video format, and starts a new GOP.

Additionally, once the video format is determined, MPEG-2 sequence parameters are set according to the new video format as designated in Table 2, below.

TABLE 2

| video format | (1) | (2) | (3) | (4) | (5) | (6) | (7) | (8) | (9) | (10) | (11) |
|---|---|---|---|---|---|---|---|---|---|---|---|
| horizontal_size | 1920 | 1920 | 1920 | 1920 | 1920 | 1920 | 1920 | 1920 | 1920 | 1280 | 1280 |
| vertical_size | 1080 | 1080 | 1080 | 1080 | 1080 | 1080 | 1080 | 1080 | 1080 | 720 | 720 |
| frame_rate_code | 1000 | 0111 | 0101 | 0100 | 0010 | 0001 | 0101 | 0100 | 0011 | 1000 | 0111 |
| frame or field rate | 60 | 59.94 | 30 | 29.97 | 24 | 23.98 | 30 | 29.97 | 25 | 60 | 59.95 |
| progressive_sequence | 1 | 1 | 0 | 0 | 1 | 1 | 1 | 1 | 1 | 1 | 1 |

In Table 2, progressive scan is indicated by progressive_sequence=1, while interlaced scan in indicated by progressive_sequence=0.

Additionally, when a change in video format is detected, the frame rate parameter is passed to a packet processor. The packet processor uses the frame rate information for Presentation Time Stamp (PTS)/Decode Time Stamp (DTS) calculations. The frame rate and picture size parameters are passed to the video compression circuit 140 of FIGS. 1 and 2. A panel splitter in the compression circuit may be configured according to the video format. A panel splitter splits a video frame into a number, e.g., eight, horizontal panels, to allow each panel of video data to be compressed by a separate compression chip in parallel, thereby speeding processing.

Figure 6:
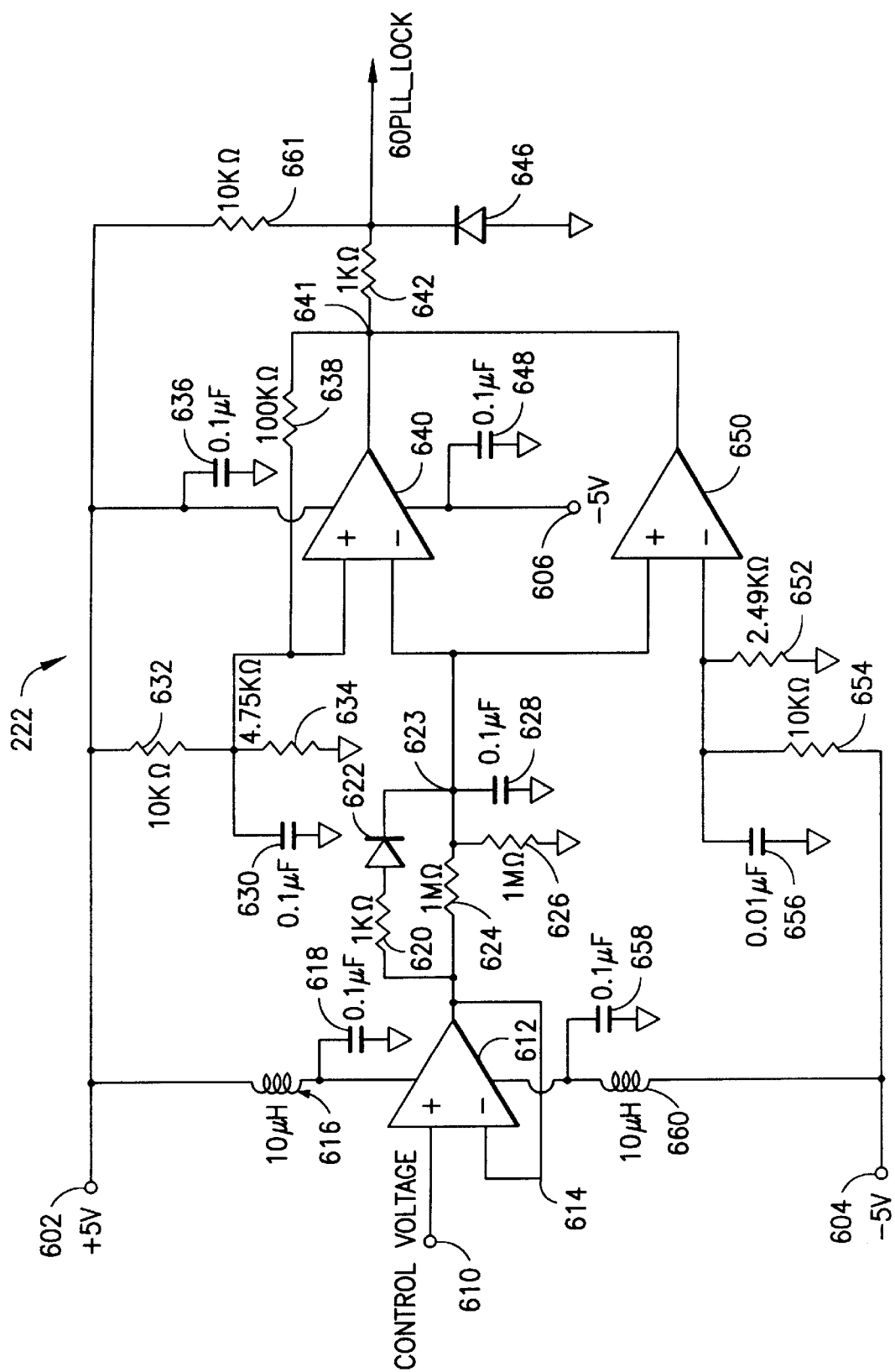
FIG. 6 illustrates a lock detector circuit for use with the present invention.

FIG. 6 illustrates a lock detector circuit for use with the present invention. The lock detector circuit 222 may also be used for the detectors 232 and 252 of FIG. 2. Generally, the function of a lock detector circuit is to detect the status of a PLL circuit. The output logic of the circuit may change based on the lock condition. The circuit 222 looks for a stable circuit at the VCXO control voltage. The PLL is determined to be locked when the control voltage is between two predetermined voltages, e.g., within a window. If the control voltage is outside this window, or if the control voltage has a large AC swing, the circuit is declared unlocked.

When a PLL circuit is not locked, the oscillator control voltage is at a positive real voltage, negative real voltage, or has an AC swing. When the PLL is locked, the control voltage is a DC voltage, with or without a small AC swing, that has values between two real voltages. The PLL output is typically a logical HIGH for locked, or LOW for unlocked, although the opposite logic levels can alternatively be used.

The circuit 222 includes a rectifier that converts AC components in the control voltage to a DC voltage so that a large AC swing would have a high DC voltage that is outside the lock window.

The circuit 222 receives a first bias voltage (e.g., +5 Volts) at a terminal 602, while a second voltage (e.g., −5 Volts) is provided at terminals 604 and 606. The control voltage, which, in the present illustration, is the input to the VCXO 226 in FIG. 2, is input to a terminal 610 and to the positive input of an amplifier 612. The amplifier 612 acts as a buffer so that the circuit 222 will not unnecessarily dissipate the control voltage. A feedback signal from the amplifier 612 is provided from its output to its negative input via a line 614. The amplifier is biased by the first bias voltage via a choke coil 616, which is coupled to ground via a capacitor 618. The amplifier is also biased by the second voltage via a choke coil 660, which is coupled to ground via a capacitor 658. The inductors 616, 660 and capacitors 618, 658 provide electromagnetic interference (EMI) filtering.

The signal output from the amplifier 612 is divided in a voltage divider comprising resistors 624 and 626. In a parallel path, the output from the amplifier 612 is provided to a resistor 620 and a diode 622 (e.g., half-wave rectifier) which passes only positive voltages. Diode 622 and resistor 624 are coupled at a common node 623, which is coupled to amplifiers 640 and 650. A capacitor 628 is provided between the node 623 and ground. The resistor 620 is provided to limit current in the charging path of the capacitor 628.

The AC signal at the output of amplifier 612 is converted to a filtered DC voltage by the diode 622 and capacitor 628, and stored across the capacitor 628. Resistors 624 and 626 enable the capacitor 628 to discharge. In addition, resistors 624 and 626 form a voltage divider such that the voltage at node 623 is a portion of the DC component of the control voltage.

The positive input to the amplifier 640 is provided from the first bias voltage at terminal 602, via the voltage divider provided, by resistors 632 and 634. These resistors set an upper voltage threshold for the PLL. A capacitor 630 is provided for noise bypass. The amplifier 640 is biased by the first bias voltage at terminal 602, and by the second bias voltage at terminal 606. Capacitors 636 and 648 provide noise filtering.

A resistor 638 provides a hysteresis signal which is added to the output of the amplifiers 640 and 650 at a node 641.

The input to the negative terminal of the amplifier 650 is the second bias voltage from terminal 604, divided in accordance with resistors 654 and 652. These resistors set a lower voltage threshold for the PLL. The voltage at node 623 must be between the upper and lower voltage thresholds (e.g., +1.6 V and −1 V) for the PLL to be locked. A capacitor 656 is provided for noise bypass. The lock detect signal, 60PLL_LOCK, is output via a resistor 642. A diode 646 limits the magnitude of the lock detect signal.

The amplifiers 640 and 650 are comparators which act as open-collector devices such that their outputs are ORed at node 641. Specifically, the output, 60PLL_LOCK, will be a logical LOW when the voltage at node 623 is greater than the threshold set by resistors 632 and 634 (e.g., +1.6 V), or when the voltage is less than the threshold set by resistors 652 and 654 (e.g., −1 V). For voltage levels intermediate to these two thresholds, the output will be a logical HIGH.

Resistor 661 is an output pull-up resistor for the open-collector comparators 640 and 650.

The circuit of FIG. 6 may be used in the lock detectors 232 and 252 to provide the lock detect signals 59.94PLL_LOCK and 54PLL_LOCK, respectively, of FIG. 2.

As can be seen, the present invention provides a system which automatically detects the format of an HDTV video source, including progressive and interlaced scan, and specific pixel and vertical line resolutions. The system is compatible with video standards such as the SMPTE and MPEG-2 standards. A video sample clock is determined by phase-locking clock pulses in a video signal to one of two or more available reference clocks. An SAV/EAV counter and pixel sample counter determine the horizontal resolution of the video, e.g., pixels per line.

The system uses PLLs for each reference clock, where a lock range of the PLLs is narrow such that two PLLs will not lock at the same time for one input frequency. The system discriminates between 24 frames per second video and 30 frames per second video, and between a 720 line progressive scan signal and a 1080 line interlaced scan signal, by counting the number of samples in a video line.

Additionally, a PLL lock detection circuit is provided for detecting different possible clock rates of a video signal according to a predetermined voltage range.

Although the invention has been described in connection with various specific embodiments, those skilled in the art will appreciate that numerous adaptations and modifications may be made thereto without departing from the spirit and scope of the invention as set forth in the claims.

For example, the invention may be adapted for use with SDTV signals, e.g., to automatically distinguish NTSC signals from PAL signals. This may be accomplished by detecting the appropriate number of pixel samples between successive SAVs or EAVs, and by detecting the appropriate video clock. The system can also be applied to distinguish U.S. HDTV format, at 30 frames per second, from European HDTV format, at 25 frames per second.

Moreover, while the detected video format is preferably used by a compressor to compress the detected video data using the appropriate format, this is not required. For example, it may be desirable to passively monitor data, e.g., for gathering statistical information, or for another purpose, such as adding auxiliary data to the video signal, e.g., for marketing or copy protection purposed.

What is claimed is:

1. A method for determining the format of a video signal, wherein said video signal comprises successive frames, each frame has successive lines, and at least some of the lines have at least one reference sequence followed by successive pixel sample fields, and wherein a clock signal of said video signal having clock pulses corresponding to the pixel sample fields is provided, comprising the steps of:

detecting the reference sequence in a particular line of said video signal;

initiating a count of said clock pulses in response to the detection of the reference sequence;

detecting the reference sequence in a subsequent line which follows said particular line;

wherein the count reaches a reference count value when the reference sequence in the subsequent line is detected;

providing a signal indicative of the reference count value to a control; and determining the format of said video signal at the control in accordance with the reference count signal.

2. The method of claim 1, wherein:

the reference sequences comprise at least one of a start of active video (SAV) sequence and an end of active video sequence (EAV).

3. The method of claim 1, comprising the further step of:

providing a control signal from the control to a video compressor for compressing said video signal in accordance with the detected format thereof.

4. The method of claim 1, wherein:

said reference count value designates at least one of a horizontal resolution, vertical resolution, and frame rate of said video signal.

5. The method of claim 1, comprising the further steps of:

monitoring said clock signal to determine when said clock pulses are not available; and providing a control signal in response to said monitoring step to select an auxiliary clock signal when said clock pulses are not available.

6. The method of claim 1, comprising the further steps of:

recovering successive ones of said clock pulses from said clock signal to obtain a video signal clock;

providing a first clock reference signal at a first frequency, and a second clock reference signal at a second frequency that is different from said first frequency;

comparing a phase of said video signal clock to respective phases of said first and second reference clocks to determine which of said reference clocks corresponds thereto;

providing a signal indicative of the corresponding reference clock to the control; and determining the format of said video signal in accordance with the corresponding reference clock.

7. The method of claim 1, comprising the further steps of:

determining a format of successive frames of said video signal to detect a format change from a first format to a second format; and inserting a sequence end code into said video signal after the last frame that is provided with the first format.

8. The method of claim 7, comprising the further step of:

inserting a sequence header at the beginning of the first frame which is provided with the second format.

9. The method of claim 1, comprising the further steps of:

detecting F bits of the video signal; and determining whether the video signal is progressive scan or interlaced scan in accordance with the detected F bits.

10. An apparatus for determining the format of a video signal, wherein said video signal comprises successive frames, each frame has successive lines, and at least some of the lines have at least one reference sequence followed by successive pixel sample fields, and wherein a clock signal of said video signal having clock pulses corresponding to the pixel sample fields is provided, comprising:

means for detecting the reference sequence in a particular line of said video signal;

means for initiating a count of said clock pulses in response to the detection of the reference sequence;

means for detecting the reference sequence in a subsequent line which follows said particular line;

wherein the count reaches a reference count value when the reference sequence in the subsequent line is detected;

means for providing a signal indicative of the reference count value to a control; and means for determining the format of said video signal at the control in accordance with the reference count signal.

11. The apparatus of claim 10, wherein:

the reference sequences comprise at least one of a start of active video (SAV) sequence and an end of active video sequence (EAV).

12. The apparatus of claim 10, further comprising:

means for providing a control signal from the control to a video compressor for compressing said video signal in accordance with the detected format thereof.

13. The apparatus of claim 10, wherein:

said reference count value designates at least one of a horizontal resolution, vertical resolution, and frame rate of said video signal.

14. The apparatus of claim 10, further comprising:

means for monitoring said clock signal to determine when said clock pulses are not available; and means for providing a control signal in response to said monitoring step to select an auxiliary clock signal when said clock pulses are not available.

15. The apparatus of claim 10, further comprising:

means for recovering successive ones of said clock pulses from said clock signal to obtain a video signal clock;

means for providing a first clock reference signal at a first frequency, and a second clock reference signal at a second frequency that is different from said first frequency;

means for comparing a phase of said video signal clock to respective phases of said first and second reference clocks to determine which of said reference clocks corresponds thereto; and means for providing a signal indicative of the corresponding reference clock to the control; wherein:

said determining means determines the format of said video signal in accordance with the corresponding reference clock.

16. The apparatus of claim 10, wherein a format of successive frames of said video signal is determined to detect a format change from a first format to a second format, further comprising:

means for inserting a sequence end code into said video signal after the last frame that is provided with the first format.

17. The apparatus of claim 16, further comprising:

means for inserting a sequence header at the beginning of the first frame which is provided with the second format.

18. The apparatus of claim 10, further comprising:

means for detecting F bits of the video signal; wherein:

said determining means determines whether the video signal is progressive scan or interlaced scan in accordance with the detected F bits.

* * * * *